United States Patent
Minowa et al.

(10) Patent No.: US 10,406,780 B2
(45) Date of Patent: Sep. 10, 2019

(54) HOT-DIP GALVANNEALED STEEL SHEET FOR HOT STAMPING AND METHOD FOR MANUFACTURING STEEL PART

(71) Applicant: KOBE STEEL, LTD., Kobe-shi (JP)

(72) Inventors: Takeshi Minowa, Kakogawa (JP); Takeshi Kojima, Kakogawa (JP); Hiroshi Irie, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 889 days.

(21) Appl. No.: 14/785,182

(22) PCT Filed: Apr. 22, 2014

(86) PCT No.: PCT/JP2014/061269
§ 371 (c)(1),
(2) Date: Oct. 16, 2015

(87) PCT Pub. No.: WO2014/175256
PCT Pub. Date: Oct. 30, 2014

(65) Prior Publication Data
US 2016/0067947 A1     Mar. 10, 2016

(30) Foreign Application Priority Data

Apr. 26, 2013   (JP) .................................. 2013-094129

(51) Int. Cl.
    *C22C 38/24*        (2006.01)
    *B32B 15/01*        (2006.01)
              (Continued)

(52) U.S. Cl.
    CPC ............ *B32B 15/013* (2013.01); *B21D 22/00* (2013.01); *C21D 8/0278* (2013.01); *C21D 9/46* (2013.01);
(Continued)

(58) Field of Classification Search
CPC ........... C23C 2/02; C23C 38/54; C23C 38/58; C23C 2/04; C23C 2/06; C23C 2/28;
(Continued)

(56) References Cited

U.S. PATENT DOCUMENTS 9,670,569 B2 *   6/2017   Nozaki ................ C21D 8/0226
9,909,194 B2 *   3/2018   Puerta Velasquez .... C21D 1/74
(Continued)

FOREIGN PATENT DOCUMENTS

CN          1639375 A     7/2005
CN       101545071 A     9/2009
(Continued)

OTHER PUBLICATIONS

"Manual: Hot-dip Galvanized Steel Sheet", The Iron and Steel Institute of Japan, Jan. 31, 1999, pp. 26-29, 32-35, and 52-55 (with partial English translation).
(Continued)

*Primary Examiner* — David B Jones
(74) *Attorney, Agent, or Firm* — Oblon, McClelland, Maier & Neustadt, L.L.P.

(57) ABSTRACT

Provided is a hot-dip galvannealed steel sheet for hot stamping use, in which a base steel sheet contains Si in an amount of 0.7% or more, and which has excellent joint strength at a spot-welded part and can exhibit excellent adhesion to a coating film after hot stamping and coating with requiring little restriction of a hot stamp step. In the hot-dip galvannealed steel sheet, a base steel sheet contains, in mass %, 0.10 to 0.5% of C, 0.7 to 2.5% of Si, 1.5 to 3% of Mn and 0.01 to 0.5% of Al. The hot-dip galvannealed steel sheet is characterized in that the Mn concentration in a plating layer is 0.20% or more, the plated amount is 75 g/m$^2$ (Continued)

or less, and the oxygen concentration at the interface between the plating layer and the base steel sheet is 0.50% or less.

3 Claims, 1 Drawing Sheet (51) Int. Cl.
*C23C 2/06* (2006.01)
*C23C 2/28* (2006.01)
*C21D 9/46* (2006.01)
*C22C 38/00* (2006.01)
*C22C 38/06* (2006.01)
*C22C 38/58* (2006.01)
*C21D 8/02* (2006.01)
*C22C 18/04* (2006.01)
*C22C 38/02* (2006.01)
*C22C 38/04* (2006.01)
*C22C 38/20* (2006.01)
*C22C 38/22* (2006.01)
*C22C 38/26* (2006.01)
*C22C 38/28* (2006.01)
*C22C 38/32* (2006.01)
*C22C 38/38* (2006.01)
*C22C 38/50* (2006.01)
*C22C 38/54* (2006.01)
*B21D 22/00* (2006.01)
*C22C 38/14* (2006.01)
*C23C 2/04* (2006.01)
*C23C 2/40* (2006.01)

(52) U.S. Cl.
CPC .............. *C22C 18/04* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/50* (2013.01); *C22C 38/54* (2013.01); *C22C 38/58* (2013.01); *C23C 2/04* (2013.01); *C23C 2/06* (2013.01); *C23C 2/28* (2013.01); *C23C 2/40* (2013.01)

(58) Field of Classification Search
CPC ...... C23C 2/40; C21D 8/0205; C21D 8/0278; C21D 9/46; B23B 15/013; B21D 22/00; C22C 38/00; C22C 38/001; C22C 38/002; C22C 38/04; C22C 38/06; C22C 38/14; C22C 38/20; C22C 38/22; C22C 38/24; C22C 38/26; C22C 38/28; C22C 38/32; C22C 38/38; C22C 38/50; C22C 38/54; C22C 38/58
USPC ........................................................ 72/364
See application file for complete search history.

(56) References Cited

U.S. PATENT DOCUMENTS

| | | | |
|---|---|---|---|
| 9,970,092 B2 * | 5/2018 | Nozaki | .................... C23C 2/06 |
| 2004/0055667 A1 | 3/2004 | Takada et al. | |
| 2004/0166360 A1 | 8/2004 | Imai et al. | |
| 2004/0202889 A1 | 10/2004 | Fujita et al. | |
| 2008/0035247 A1 | 2/2008 | Fujita et al. | |
| 2009/0238715 A1 | 9/2009 | Cho et al. | |
| 2009/0272467 A1 | 11/2009 | Fujita et al. | |
| 2010/0040906 A1 | 2/2010 | Irie et al. | |
| 2013/0236740 A1 | 9/2013 | Kojima et al. | |

FOREIGN PATENT DOCUMENTS

| | | |
|---|---|---|
| CN | 101583734 A | 11/2009 |
| EP | 2 112 247 A1 | 10/2009 |
| JP | 2001-158918 A | 6/2001 |
| JP | 2002-294397 A | 10/2002 |
| JP | 2003-49239 A | 2/2003 |
| JP | 2003-147499 A | 5/2003 |
| JP | 2004-270029 A | 9/2004 |
| JP | 2006-265583 A | 10/2006 |
| JP | 2007-56307 A | 3/2007 |
| JP | 2007-169679 A | 7/2007 |
| JP | 2007-314817 A | 12/2007 |
| JP | 2009-68039 A | 4/2009 |
| JP | 2009-263692 A | 11/2009 |
| JP | 2011-509341 A | 3/2011 |
| JP | 2011-214102 A | 10/2011 |
| JP | 2012-41597 A | 3/2012 |
| JP | 2013-87313 A | 5/2013 |
| JP | 2013-117043 A | 6/2013 |
| JP | 2013-185215 A | 9/2013 |
| JP | 2014-5514 A | 1/2014 |
| JP | 2014-9399 A | 1/2014 |
| WO | 2009/082078 A1 | 7/2009 |

OTHER PUBLICATIONS

International Search Report and Written Opinion dated Aug. 5, 2014 in PCT/JP2014/061269 filed Apr. 22, 2014.
Extended European Search Report dated Nov. 7, 2016 in Patent Application No. 14788810.1.

* cited by examiner

HOT-DIP GALVANNEALED STEEL SHEET FOR HOT STAMPING AND METHOD FOR MANUFACTURING STEEL PART

TECHNICAL FIELD

The present invention relates to a hot-dip galvannealed steel sheet for hot stamping, and a method for manufacturing a steel part. The invention preferably relates to a hot-dip galvannealed steel sheet, for hot stamping, that is favorably usable in the field of thin-steel-sheet formed products applied mainly to car bodies, and a method for manufacturing a steel part in which this hot-dip galvannealed steel sheet is used. Hereinafter, the steel part may be called "hot-stamped product" or "part".

BACKGROUND ART

In recent years, as a technique capable of attaining compatibility between an increase of a steel in strength, and the formation thereof into a complicated shape, a hot stamping technique has been suggested, which is a technique of pressing, at a high temperature, a steel sheet (a hot-rolled and pickled steel sheet obtained by subjecting an original steel to hot rolling and pickling; a cold-rolled steel sheet; or a galvanized steel sheet in which any one of these steel sheets is used as a base steel sheet) to produce a steel product. Hot stamping is also called, for example, hot forming or hot pressing, and is a method of heating the steel sheet to a high temperature not lower than the temperature range ($Ac_1$ transformation point) of austenite+ferrite, and then pressing the steel sheet. According to the hot stamping, car parts each having a complicated shape can be obtained while the parts have a high strength.

Patent Literature 1 discloses a hot-rolled and pickled steel sheet or a cold-rolled steel sheet as a steel sheet usable in the hot stamping method. It is disclosed that by heightening the proportion of Si in the hot-rolled and pickled steel sheet or cold-rolled steel sheet to 0.7% or more, an improvement is made in the bonding strength of a spot-welded region thereof (the strength may be referred to as the "welding strength of the spot-welded region"; the same will be applied to the following). Patent Literature 1 also discloses that when a relationship between Ti and N is appropriately controlled and B is caused to be present in a solid solution state, the steel sheet is restrained from being deteriorated in hot formability by an increase in Si proportion.

When a car part is produced by press forming, a hot-rolled and pickled steel sheet or cold-rolled steel sheet, as described above, is used as a steel sheet to be supplied to the press forming. Besides, from the viewpoint of improving the corrosion resistance, a galvanized steel sheet obtained by galvanizing any one of these steel sheets is also used. Galvanized steel sheets are roughly classified mainly into zinc-galvanized steel sheets and Al-plated steel sheets. The zinc-galvanized steel sheets are widely used, considering the corrosion resistance, and others.

Zinc, which constitutes the galvanizing coating layer of the zinc-galvanized steel sheets, has a melting point of 419° C., and a boiling point of 907° C. to turn into a liquid phase or gas phase in a temperature range in which the steel sheet is hot-stamped. In the hot stamping step, generally, the steel sheet is heated in the atmosphere. Thus, active zinc in the state of the liquid phase or gas phase is easily oxidized so that zinc oxide (oxide film) is easily generated in the surface of the steel sheet.

A car part is obtained by hot-stamping a steel sheet, and subjecting the resultant to chemical treatment or electrodeposition coating. However, when zinc oxide (oxide film) is thinly formed onto the surface of a base steel sheet in the hot stamping step, there is caused such a problem that a coating film formed by the coating is easily peeled away (the adhesion of coating film is lowered).

As a method for avoiding this problem, Patent Literature 2 discloses the following technique: a technique of improving the adhesion of coating film by forming an oxide coating film containing Ti, Zr, Si or some other in a chemical treatment after the hot stamping. However, such a chemical treatment is unfavorable since the treatment is different from ordinary phosphate-treatments so that a liquid for the treatment needs to be changed, or other restrictions are imposed onto the producing process. Additionally, in the technique of Patent Literature 2, by use of two heating furnaces, the heating temperature in the hot stamping step is controlled, and the heating period therefor is shortened. In this way, the growth of the zinc oxide film is controlled. Although in any hot stamping step a single heating furnace is usually used, the technique referred to herein requires two heating furnaces to increase costs for facilities and in the producing process. The base steel sheet disclosed in Patent Literature 2 has a Si concentration of 0.5% or less to have a problem of not gaining a high welding strength at a spot-welded region thereof.

CITATION LIST

Patent Literatures

Patent Literature 1: JP 2007-169679 A
Patent Literature 2: JP 2007-56307 A

SUMMARY OF INVENTION

Technical Problem

In light of the above-mentioned situation, the present invention has been made. An object thereof is to provide a hot-dip galvannealed steel sheet, for hot stamping, that is excellent in the following property in the case of using, in a hot stamping step, a hot-dip galvannealed steel sheet which contains 0.7% or more of Si to be excellent in spot-welded-region bonding-strength even when restrictions are hardly imposed onto the hot stamping step: the adhesion of a coating film after the hot stamping step, and coating of the coating film. Another object thereof is to provide a method for manufacturing a steel part in which the hot-dip galvannealed steel sheet is used.

Solution to Problem

The hot-dip galvannealed steel sheet of the present invention for hot stamping, which has solved the above-mentioned problems, comprises a base steel sheet comprising 0.10 to 0.5% of C, 0.7 to 2.5% of Si, 1.5 to 3% of Mn, and 0.01 to 0.5% of Al, and a galvanizing coating layer having a Mn concentration of 0.20% or more; and has a coating weight of galvanizing coating layer of 75 g/m² or less and an oxygen concentration of 0.50% or less in an interface between the galvanizing coating layer and the base steel sheet, the above-mentioned "%" symbols each representing "% by mass". The coating weight of galvanizing coating layer denotes the coating weight of galvanizing coating layer per surface of the steel sheet (the same will be applied to the following).

In a preferred embodiment of the present invention, the base steel sheet comprises B in a proportion of more than 0%, and 0.005% or less, the "%" symbols each representing "% by mass".

In a preferred embodiment of the present invention, the base steel sheet comprises Ti in a proportion of more than 0%, and 0.10% or less, the "%" symbols each representing "% by mass".

In a preferred embodiment of the present invention, the base steel sheet comprises at least one element of Cr and Mo in a total proportion of more than 0%, and 2.5% or less, the "%" symbols each representing "% by mass".

In a preferred embodiment of the present invention, the base steel sheet comprises at least one element selected from the group consisting of Nb, Zr and V in a total proportion of more than 0%, and 0.1% or less, the "%" symbols each representing "% by mass".

In a preferred embodiment of the present invention, the base steel sheet comprises at least one element of Cu and Ni in a total proportion of more than 0%, and 1% or less, the "%" symbols each representing "% by mass".

The present invention also includes a method for manufacturing a steel part, wherein hot stamping is performed, using the above-mentioned hot-dip galvannealed steel sheet.

Advantageous Effects of Invention

According to the present invention, the Si concentration in the steel is 0.7% or more. Thus, a hot-dip galvannealed steel sheet for hot stamping can be provided which is excellent in bonding strength of its spot-welded region, and which is excellent in adhesion of coating film after the sheet is subjected to hot stamping and coating without restricting the step of the hot stamping substantially.

DESCRIPTION OF EMBODIMENTS

The inventors have repeated investigations to gain a hot-dip galvannealed steel sheet about which a spot-welded region is to be improved in bonding strength by heightening the Si proportion in its base steel sheet to 0.7% or more, and about which the adhesion of a coating film is to be excellent after the steel sheet is subjected to hot stamping, and coating of the coating film. As a result, the inventors have found out that the following are very effective:

(A) The Mn concentration in the galvanizing coating layer is heightened.

(B) The coating weight of galvanizing coating layer is restrained into a predetermined level or less.

(C) Oxides are restrained at an interface between the galvanizing coating layer and the base steel sheet (the interfacial oxygen concentration is restrained to a predetermined level or less).

Hereinafter, a detailed description will be made about the requirements (A) to (C) as well as circumstances that the present invention has been achieved. The base steel sheet refers to a hot-rolled and pickled steel sheet or a cold-rolled steel sheet. The same will be applied to the following.

The inventors have initially examined causes for deteriorating a galvanized steel sheet in adhesion of coating film after the steel sheet is subjected to hot stamping and coating. As a result, the inventors have ascertained that the causes are the following:

(i) A matter that at the time of heating the galvanized steel sheet in the hot stamping step, the following are low in adhesion onto the galvanizing coating layer: one or more surface-layer oxides (one or more simplex oxides or complex oxides of one or more components in the base steel sheet or the galvanizing coating layer, such as Si, Mn, Fe and/or Zn; the same will be applied to the following) formed on/in the front surface (the surface in contact with the atmosphere) of the galvanizing coating layer.

(ii) A matter that, in particular, the growth of the surface-layer oxide(s) advances, whereby voids are generated between the surface-layer oxide(s) (the oxide-layer) and the galvanizing coating layer, so that the voids cause a further lowering in the adhesion.

Thus, the inventors have made eager investigations about a means for restraining the growth of the surface-layer oxide(s) at the heating time in the hot stamping step, and further heightening the adhesion between the produced surface-layer oxide(s) and the galvanizing coating layer. As a result, the inventors have found out that: at the heating time of the hot stamping step, Mn that has diffused to a surface-layer portion that is present at the side in contact with the atmosphere of the galvanizing coating layer (hereinafter, the portion may be referred to as a "surface-layer portion of galvanizing coating layer") produces an advantage of restraining the growth of the surface-layer oxide(s) (that is, of producing Mn-containing oxide, which is small in growing speed, as a surface-layer oxide); and further the Mn produces an advantage of heightening the adhesion between the produced surface-layer oxide(s) and the galvanizing coating layer, thereby improving the adhesion of coating film.

Furthermore, in order to realize the effect and advantages sufficiently, at the heating time in the hot stamping step, Mn needs to be present in (or reach) the surface-layer portion of galvanizing coating layer before the surface-layer oxide(s) are produced in a larger quantity to grow. The inventors have found out, as a specific means for the need, that Mn is caused to be beforehand present in a predetermined proportion or more in the galvanizing coating layer, as described in the item (A).

Mn is an element contained in the base steel sheet. In order to cause Mn in the base steel sheet to reach the surface-layer portion of galvanizing coating layer, it is necessary to make the heating period long. However, if the heating period in the hot stamping step becomes long, surface-layer oxides low in adhesion to the galvanizing coating layer are produced to grow before Mn in the base steel sheet reaches the surface-layer portion of galvanizing coating layer. As described above, therefore, it is effective to cause Mn to be beforehand present in a predetermined proportion or more in the galvanizing coating layer, and diffuse the Mn in a large proportion speedily into the surface-layer portion of galvanizing coating layer at the heating time in the hot stamping step.

The inventors have further investigated the Mn concentration, in the galvanizing coating layer, for producing the advantages. As a result, it has been understood that when the Mn concentration (% by mass) is set to 0.20% or more, the hot-dip galvannealed steel sheet can gain an excellent adhesion of coating film. The Mn concentration in the galvanizing coating layer is preferably 0.22% or more, more preferably 0.24% or more, even more preferably 0.30% or more, even more preferably 0.35% or more. Considering the component composition in the base steel sheet in the present invention, and producing conditions thereof that will be described later, the upper limit of the Mn concentration in the galvanizing coating layer is about 2.0%.

Mn in the galvanizing coating layer is preferably present in a solid solution state (in the state of solute Mn) in the galvanizing coating layer. This is because the above-mentioned effect and advantages would be exhibited not by Mn in the state of a compound such as an oxide, but by the state of solute Mn.

In order to heighten the Mn concentration in the galvanizing coating layer as described above, it is recommendable to control the following appropriately, as will be described later: the Mn concentration in the steel, and conditions for reducing annealing (the annealing temperature (soaking temperature) and the annealing period (soaking period) in a reducing atmosphere) before the galvanizing.

In order to restrain the growth of the surface-layer oxide, it is also necessary to (B) control the coating weight of galvanizing coating layer into a predetermined value or less, as will be described later.

At the time of the heating in the hot stamping step, the above-mentioned oxidation of the surface of galvanizing coating layer is generated, and further alloying components diffuse from the base steel sheet to the galvanizing coating layer so that the alloying of the galvanizing coating layer advances. Usually, as the alloying of the galvanizing coating layer advances further, the melting point of the galvanizing coating layer becomes higher. Thus, the above-mentioned liquefaction of zinc (the production of melted zinc) is restrained so that the production of zinc oxide (oxide film) is also restrained. However, when the coating weight of the galvanizing coating layer (galvanization coating weight) becomes large, the alloying components do not diffuse sufficiently from the base steel sheet to the surface-layer portion of galvanizing coating layer, that is, the alloying does not advance, so that melted zinc is generated in the surface-layer portion of galvanizing coating layer to cause a problem that the production of zinc oxide (oxide film) is promoted.

Thus, in the present invention, the coating weight of galvanizing coating layer is controlled into a predetermined quantity or less to decrease the quantity of melted zinc generated in the hot stamping step, thereby restraining the production/growth of any surface-layer oxide. Specifically, the coating weight of galvanizing coating layer is set to 75 g/m$^2$ or less. The upper limit of the coating weight of galvanizing coating layer is preferably 70 g/m$^2$ or less, more preferably 68 g/m$^2$ or less, even more preferably 65 g/m$^2$ or less, even more preferably 63 g/m$^2$ or less, even more preferably 60 g/m$^2$ or less, even more preferably 58 g/m$^2$ or less, even more preferably 55 g/m$^2$ or less, most preferably 50 g/m$^2$ or less. In order to restrain the production/growth of the surface-layer oxide, it is more preferred that the coating weight of the hot-dip galvannealed layer is smaller. However, in order to cause the galvanizing coating layer to exhibit an excellent corrosion resistance, which is an original role of the galvanizing coating layer, the coating weight of galvanizing coating layer is preferably 30 g/m$^2$ or more, more preferably 35 g/m$^2$ or more, even more preferably 40 g/m$^2$ or more, even more preferably 45 g/m$^2$ or more.

Furthermore, in order to promote the diffusion of the alloying components from the base steel sheet to the galvanizing coating layer, it is advisable to (C) cause any oxide that hinders the diffusion of the alloying components (hereinafter referred to also as any "interfacial oxide") to be present as little as possible in the interface between the galvanizing coating layer and the base steel sheet. In order to comprehend the amount of the interfacial oxide quantitatively in the present invention, the oxygen concentration in the interface between the galvanizing coating layer and the base steel sheet (hereinafter referred to also as the "interfacial oxygen concentration") has been used as an index for evaluating the quantity of the interfacial oxide, as analyzed in Examples that will be described later. As will be shown in Examples, which will be described later, the inventors have found out that in order that the steel sheet can ensure an excellent adhesion of coating film, it is sufficient for the interfacial oxygen concentration (% by mass) to be set to 0.50% or less. The interfacial oxygen concentration is preferably 0.48% or less, more preferably 0.46% or less. From the viewpoint of productivity and others, the lower limit of the interfacial oxygen concentration is about 0.10%. The interfacial oxygen concentration will be analyzed by a method described in Examples, which will be described later.

In order to set the interfacial oxygen concentration to 0.50% or less, it is recommendable to control the annealing conditions appropriately, as will be described later.

The hot-dip galvannealed steel sheet of the present invention has, on at least one of the surfaces of the steel sheet, the galvanizing coating layer having the above-mentioned structure.

The following will describe the component composition of the base steel sheet of the hot-dip galvannealed steel sheet of the present invention. About the component composition of the original steel sheet (base steel sheet) used in the invention, the following is presupposed to heighten the bonding strength of its spot welded portion: the proportion of Si is set to 0.7% or more. Moreover, in order to set the Mn concentration in the galvanizing coating layer to a predetermined proportion or more, the component composition is characterized in that the Mn proportion in the steel is set to a predetermined value or more, as will be described below.

[C: 0.10 to 0.5%]

C is an element contributing, as a solute strengthening element, to an improvement in the strength of the hot-stamped steel sheet, that is, a steel part thereof. In order that the steel sheet can obtain a desired high strength of 980 MPa or more by the hot stamping, the C proportion is set to 0.10% or more. The C proportion is preferably 0.13% or more, more preferably 0.15% or more, even more preferably 0.17% or more. However, if the C proportion becomes excessive, the hot-stamped product is lowered in weldability. Thus, the C proportion is set to 0.5% or less. The C proportion is preferably 0.40% or less, more preferably 0.35% or less, even more preferably 0.30% or less.

[Si: 0.7 to 2.5%]

Si is an element contributing to an improvement in the bonding strength of the spot-welded region of the hot-stamped product. Si also has an advantage of preventing the hot-stamped part from being tempered in a slowly cooling step after the hot stamping, thereby keeping the strength of the part. Furthermore, Si is an element for producing retained austenite to contribute also to an improvement of the part in ductility. In order to cause the steel sheet to exhibit these advantages effectively, the Si proportion is set to 0.7% or more. The Si proportion is preferably 0.75% or more, more preferably 0.80% or more, even more preferably 0.90% or more, even more preferably 1.0% or more. However, if the Si proportion becomes excessive, the steel becomes too high in strength so that a burden is increased onto heading when the base steel sheet is produced. Furthermore, scales containing $SiO_2$ are generated on the base steel sheet surface when the steel is hot rolled. Thus, after galvanized, the steel sheet is deteriorated in surface nature. Thus, the Si proportion is set to 2.5% or less. The Si proportion is preferably 2.3% or less, more preferably 2.1% or less.

[Mn: 1.5 to 3%]

Mn is an element necessary for setting the Mn concentration in the galvanizing coating layer to a predetermined value or more to cause the steel sheet to ensure an excellent adhesion of coating film. In order to set the Mn concentration in the galvanizing coating layer to the predetermined value or more, it is necessary in the alloying step in the production of the galvanized steel sheet to diffuse Mn from the base steel sheet to the galvanizing coating layer. By heightening the Mn proportion in the base steel sheet, the diffusion of Mn can be promoted so that the Mn concentration in the galvanizing coating layer can be more efficiently heightened. Moreover, Mn is an element useful for heightening the quenchability to restrain a high strength of the hot-stamped product from being varied. In order to cause the steel to exhibit these advantages sufficiently, the Mn proportion is set to 1.5% or more. The Mn proportion is preferably 1.7% or more, more preferably 1.9% or more, even more preferably 2.1% or more. In the meantime, if the Mn proportion becomes excessive, the steel becomes too high in strength so that a burden is increased onto heading when the base steel sheet is produced. Thus, the Mn proportion is set to 3% or less. The Mn proportion is preferably 2.8% or less, more preferably 2.5% or less.

[Al: 0.01 to 0.5%]

Al is an element necessary for deoxidation. Thus, the Al proportion is set to 0.01% or more. The Al proportion is preferably 0.03% or more. However, if the Al proportion becomes excessive, the advantage is saturated and further alumina or other inclusions increase to deteriorate the workability. Thus, the Al proportion is set to 0.5% or less. The Al proportion is preferably 0.3% or less.

The base steel sheet constituting the hot-dip galvannealed steel sheet of the present invention for hot stamping basically contains the above-mentioned components, and contains, as the balance thereof, iron and inevitable impurities. The inevitable impurities are, for example, P, S and N.

P is an element that produces a bad effect onto the bonding strength of the spot-welded region. If the P proportion is excessive, P segregates in a finally solidified surface of nuggets produced by the spot welding, so that the nuggets are made brittle to lower the bonding strength. Accordingly, the P proportion is preferably set to 0.02% or less. The P proportion is more preferably 0.015% or less.

Equivalently to P, S is an element that produces a bad effect onto the bonding strength of the spot-welded region. If the S proportion is excessive, the breakdown of grain boundaries in the nuggets is promoted by grain boundary segregation in the nuggets, so that the spot-welded region is lowered in bonding strength. Accordingly, the S proportion is preferably set to 0.01% or less. The S proportion is more preferably 0.008% or less.

N is bonded to B to decrease the proportion of solute B, thereby giving a bad effect onto the quenchability. If the N proportion is excessive, the precipitation quantity of a nitride increases to produce a bad effect onto the toughness. Thus, the N proportion is preferably set to 0.01% or less. The proportion is more preferably 0.008% or less. Considering costs in the steel production, and others, the N proportion is usually 0.001% or more.

Besides the above-mentioned components, optional elements described below may be further added to the present invention, as required.

[B: More than 0%, and 0.005% or Less]

B is an element for improving the quenchability of the steel. In order to cause the steel to exhibit this advantage, it is preferred to incorporate B in a proportion of 0.0003% or more. The B proportion is more preferably 0.0005% or more, even more preferably 0.0010% or more. In the meantime, if the B proportion is more than 0.005%, a coarse boride precipitates in the hot-stamped product so that the product is deteriorated in toughness. Thus, the B proportion is preferably set to 0.005% or less. The proportion is preferably 0.004% or less.

[Ti: More than 0%, and 0.10% or Less]

Ti is an element having a role for fixing N to ensure the quenching effect based on B. Ti also has an advantage of making the microstructure fine. By making the microstructure fine, the steel part is improved in ductility. In order to cause the steel to exhibit such advantages sufficiently, the Ti proportion is preferably set to 0.01% or more. The proportion is more preferably 0.02% or more. However, if the Ti proportion is excessive, the steel sheet is deteriorated in ductility. Thus, the Ti is preferably set to 0.10% or less. The proportion is more preferably 0.07% or less.

[At Least One Element of Cr and Mo: More than 0%, and 2.5% or Less in Total]

Cr and Mo are elements effective for improving the base steel sheet in quenchability. When the sheet contains these elements, it is expectable that a variation of the hardness of the resultant hot-stamped product is decreased. These elements may be used alone, or in combination of the two. In order to cause the steel to exhibit such effects effectively, the total proportion of these elements is preferably set to 0.01% or more. When the steel contains Cr or Mo singly, the total proportion is the proportion of the single element. When the two elements are used in combination, the total proportion is the proportion of the whole of the two. The total proportion is more preferably 0.05% or more, even more preferably 0.10% or more. However, if the total proportion of these elements becomes excessive, the advantages are saturated and further costs increase. Thus, the upper limit thereof is preferably set to 2.5% or less. The total proportion is more preferably 2.2% or less, even more preferably 1.9% or less, even more preferably 1.6% or less, even more preferably 1% or less, even more preferably 0.5% or less, most preferably 0.3% or less.

[At Least One Element Selected from the Group Consisting of Nb, Zr and V: More than 0%, and 0.1% or Less in Total]

Nb, Zr and V have an advantage of making the microstructure fine, and have an advantage of improving the ductility of the part by the microstructure made fine. In order to cause the steel to exhibit such advantages effectively, the total proportion of these elements is preferably set to 0.01% or more. The proportion is more preferably 0.02% or more. When the steel contains Nb, Zr or V singly, the total proportion is the proportion of the single element. When two of the elements are used in combination, the total proportion is the proportion of the whole of the two elements. However, if the total proportion of these elements becomes excessive, the advantages are saturated and further costs increase. Thus, the upper limit thereof is preferably set to 0.1% or less. The upper limit is more preferably 0.05% or less.

[At Least One Element of Cu and Ni: More than 0%, and 1% or Less in Total]

Cu and Ni are elements added optionally when it is desired to give lagging destruction resistance to the hot-stamped product. These elements may be used alone, or in combination of the two. In order to cause the steel to exhibit such an effect effectively, the total proportion of these elements is preferably set to 0.01% or more. When the steel contains Cu or Ni singly, the total proportion is the proportion of the single element. When the two elements are used in combination, the total proportion is the proportion of the whole of the two. The total proportion is more preferably 0.05% or more. However, if the proportion of these elements becomes excessive, the excess causes the generation of a surface defect when the steel sheet is produced. Thus, the upper limit thereof is preferably set to 1% or less. The upper limit is more preferably 0.5% or less.

In the present invention, the method for producing the hot-dip galvannealed steel sheet is not restricted. The galvanized steel sheet may be produced through the following steps: casting of a steel of predetermined components→heating→hot rolling→pickling (→optional cold rolling)→annealing→hot-dip galvanizing step→alloying step. In order to set the Mn concentration in the galvanizing coating layer into the above-mentioned range, it is preferred to control the following appropriately as will be detailed below: annealing (thermal treatment in a reducing atmosphere) conditions (the annealing temperature and the annealing period) in the annealing step.

Hereinafter, the production method will be described along the order of the steps.

Initially, a steel satisfying the above-mentioned components is cast, and heated. Conditions for the heating are not particularly limited. Thus, ordinarily usable conditions are appropriately adoptable. The heating is preferably performed at a temperature of about 1100 to 1300° C.

Next, the steel is hot-rolled. Conditions for the hot rolling are not particularly limited. Thus, ordinarily usable conditions are appropriately adoptable. Roughly, the conditions are preferably as follows:

Finisher delivery temperature (FDT): 800 to 950° C.
Coiling temperature (CT): 500 to 700° C.

The upper limit of the sheet thickness of the steel sheet (hot-rolled steel sheet) obtained by the hot rolling is preferably 3.5 mm or less. The sheet thickness is more preferably 3.0 mm or less, more preferably 2.5 mm or less.

After the hot rolling, the steel sheet is pickled to produce a hot-rolled and pickled steel sheet. In this pickling step, it is sufficient for at least hot roll scales to be removed by the pickling. For example, in a coil undergoing a high coiling temperature after the hot rolling, a grain boundary oxide layer based on an oxide of Si or Mn may be formed near an interface between the hot roll scales and the base steel sheet. However, the remaining of the grain boundary oxide layer does not produce any bad effect onto the galvanizability, which gives, for example, bare spots. Thus, it is not necessarily essential to remove the grain boundary oxide layer in the acidity step. However, it is preferred from the viewpoint of the stabilization of properties of the surface, such as the external appearance and the roughness, to remove the grain boundary oxide layer as much as possible. A pickling method usable ordinarily for removing a grain boundary oxide layer is appropriately adoptable. It is preferred to perform the pickling for 20 to 300 seconds, using, for example, hydrochloric acid heated to 80 to 90° C. At this time, it is preferred to add, to the hydrochloric acid, a pickling promoter (for example, a compound having a mercapto group) or an inhibitor (for example, an organic amine compound) in an appropriate amount.

A preferred thickness of the thus obtained hot-rolled and pickled steel sheet is also substantially equal to that of the above-mentioned hot-rolled steel sheet.

After the pickling, the steel sheet may be optionally cold-rolled to produce a cold-rolled steel sheet. The galvanized steel sheet of the present invention is favorably usable for car members, particularly, in order to make cars light. Thus, its base steel sheet is preferably a cold-rolled steel sheet from the viewpoint of the dimension precision and the flatness thereof.

The cold rolling reduction is preferably controlled into a range from about 20 to 70%, considering the productivity in factories, and others. The upper limit of the sheet thickness of the thus obtained cold-rolled steel sheet is preferably 2.5 mm or less. The sheet thickness is more preferably 2.0 mm or less, even more preferably 1.8 mm or less.

Next, the hot-rolled and pickled steel sheet or cold-rolled steel sheet obtained as described above (hereinafter the sheet may be represented by the base steel sheet thereof) is supplied to a continuous galvanizing step in a reducing furnace manner. In general, a step performed in a hot-dip galvanizing line in a reducing furnace manner is divided into a pre-treatment step, an annealing step and a galvanizing step (including an alloying treatment). The annealing step of the hot-dip galvanizing line is usually composed of a reducing furnace, and a cooling zone. In the present invention, it is preferred to control conditions for the annealing in the reducing furnace (the thermal treatment temperature and period in a reducing atmosphere) appropriately, as will be described later. Of course, the method in the present invention is not limited to the above-mentioned embodiment. Thus, the hot-dip galvanizing line may be performed through a continuous annealing line in a non-oxidizing furnace manner. Hereinafter, the galvanizing step will be described on the basis of the embodiment referred to herein.

Firstly, the base steel sheet is subjected to pre-treatment. The pre-treatment is a treatment conducted usually for removing oil (oil and fat), and dirt on the surface of the steel sheet. This treatment is typically conducted by alkali degreasing. A alkali used in the alkali degreasing is not particularly limited as far as the alkali is an alkali capable of removing oil and fat, and others as a water-soluble soap. The alkali is preferably, for example, sodium hydroxide or a silicate. In order to improve the degreasing performance, the following may be conducted: electrolytic cleaning, a scrubber treatment, and/or a surface/cleating-agent adding treatment. In the present invention, the method for the pre-treatment is not particularly limited as far as the method attains an appropriate degreasing of the steel sheet surface. Thus, two or more of the above-mentioned treatments may be combined with each other at will. When the alkali degreasing is conducted as the pre-treatment, the steel sheet is hot-rinsed to remove the degreasing liquid adhering onto the steel sheet, and then dried with, for example, a drier.

Next, the pre-treated base steel sheet is put into a reducing furnace, and annealed in the reducing furnace (thermally treated in a reducing atmosphere). About conditions for the annealing at this time, it is preferred that the period for residence (referred to also as the annealing period or "soaking period") in the range (referred to also as the annealing temperature or "soaking temperature") of 500 to 700° is set into a range of 30 to 270 seconds. The annealing treatment in this temperature range is also called the soaking treatment. The lower limit value of the annealing temperature is more preferably 530° C. or higher, even more preferably 560° C. or higher, even more preferably 600° C. or higher. The upper limit value of the annealing temperature is more preferably 680° C. or lower, more preferably 660° C. or lower. The lower limit value of the annealing period is more preferably 60 seconds or more, even more preferably 90 seconds or more. The upper limit value of the annealing period is more preferably 240 seconds or less, even more preferably 210 seconds or less. From the viewpoint of energy saving, before put into the reducing furnace, the pre-treated steel sheet may be preheated in a preheating furnace having a reducing atmosphere using an exhaust gas. Conditions for the preheating at this time are not particularly limited as far as the conditions are ones for the reducing atmosphere.

The annealing conditions have been decided by many basic experiments from the viewpoint (1) that in this annealing step Si or Mn is concentrated into the base steel sheet surface to restrain the production of any Si-based oxide or Mn-based oxide (interfacial oxide), so that the diffusion of Mn is promoted from the base steel sheet to the galvanizing coating layer in an alloying treatment step that will be described later to heighten the Mn concentration in the galvanizing coating layer; and the viewpoint (2) that the concentration of Si (the production of the Si-based oxide) into the base steel sheet surface is restrained to reduce a very thin Fe-based oxide formed on the base steel sheet surface, so that bare spots are lost.

From the viewpoint (1), if the annealing temperature is too high over the upper limit thereof, or the annealing period is too long, a Si-based oxide and Mn-based oxide are easily produced on the base steel sheet surface. When these oxides are present between the base steel sheet and the galvanizing coating layer, the diffusion of Mn from the base steel sheet to the galvanizing coating layer is hindered in the alloying step. As a result, it is difficult to keep the Mn concentration in the galvanizing coating layer at a predetermined level or more. Moreover, even when the Mn-based oxide is taken into the galvanizing coating layer in the galvanizing step, the taking-in does not contribute to any improvement in the above-mentioned adhesion of coating film after the hot stamping, as described above.

The following can be concluded from the viewpoint (2): If the upper limit/lower limit of the annealing temperature and the upper limit/the lower limit of the annealing period are each out of the above-mentioned range, bare spots are generated. In particular, if the annealing temperature is too high or the annealing period is too long, a Si-based oxide is easily produced on the surface so that bare spots are easily generated. In the meantime, if the annealing temperature is too low or the annealing period is too short, an Fe-based oxide remains easily so that bare spots are easily generated, as well. Specifically, in order not to generate any bare spot, it is preferred to control the annealing conditions appropriately in the light of a balance between the temperature and the period at the annealing time. For example, when the annealing temperature is high, the annealing period can be made short. In the meantime, when the annealing temperature is low, the annealing period can be made long.

In order to heighten the Mn concentration easily in the galvanizing coating layer, it is preferred to make the annealing temperature lower within the above-mentioned range (500 to 700° C.). For example, the annealing temperature is preferably set into the range of 500 to 650° C. The temperature is more preferably from 500 to 600° C. When the annealing temperature is made lower in this way, it is preferred to make the annealing period longer. The annealing period is preferably set to, for example, 45 seconds or longer. The period is more preferably 60 seconds or longer.

In a case where as performed in the present invention, a steel containing Si in a large proportion is generally galvanized apart from the case of being used for hot stamping, the following method is generally adopted to prevent the generation of bare spots: for example, a method of pre-galvanizing the steel sheet before the annealing step; or a redox method of oxidizing the steel sheet before the reducing annealing in the reducing furnace. In the present invention, however, these methods are unnecessary since galvanizing is performed after an appropriate reducing annealing is performed, as will be detailed later. The method for the pre-galvanizing results in an increase in costs because of an introduction of especial facilities. When a galvanizing coating layer is produced by the redox method, an easily oxidizable element such as Mn is detected in the galvanizing coating layer (Experiments Nos. 9 and 10 in Examples, which will be described later). However, the detected Mn would not be solute Mn, which contributes to an improvement in the adhesion of coating film, but Mn that produces a Mn-based oxide. The Mn-based oxide remains easily as an interfacial oxide. The interfacial oxide hinders the diffusion of Mn from the base steel sheet to the galvanizing coating layer in the alloying treatment. Thus, the Mn-based oxide is not preferred for an excellent adhesion of coating film to the galvanized steel sheet.

The atmosphere and the dew point at the reducing time are not particularly limited as far as these are in a range not permitting the generation of any bare spot. For example, it is preferred to use a $H_2$—$N_2$ mixed gas, set the $H_2$ concentration into the range of 1 to 30%, and set the dew point into the range of −10 to −60° C. The dew point range is preferably from −30 to −60° C., more preferably from −35 to −60° C., even more preferably −40 to −60° C., even more preferably from −45 to 60° C. Specifically, it is recommendable to control the annealing period appropriately in the light of the above-mentioned relationship between the temperature and the period at the annealing time.

Next, the base steel sheet taken out from the reducing furnace is cooled in the cooling zone. The cooling zone is usually composed of a slowly cooling zone, a rapidly cooling zone, and an adjusting zone (also called a holding zone). It is sufficient for the method for the cooling to be performed under ordinarily usable conditions not to generate any bare spot. The method is, for example, a method of blowing a gas for a reducing atmosphere onto the steel sheet to cool the steel sheet.

The continuous annealing step is performed in this way, and subsequently the front and rear surfaces of the steel sheet are galvanized. Detailedly, the steel sheet is subjected to a hot-dip galvanizing step (including an alloying treatment step) to form a hot-dip galvannealed layer.

The hot-dip galvanizing step is not particularly limited. Thus, an ordinarily usable method is adoptable. For example, it is sufficient for the temperature of a hot-dip galvanizing bath therefor to be controlled into the range of about 430 to 500° C. In the present invention, the coating weight of the hot-dip galvannealing is 75 g/m² or less. The coating weight of the galvanization is adjustable by gas wiping, or some other method.

The alloying step is not particularly limited, either. Thus, an ordinarily usable method is adoptable. For example, it is sufficient for the alloying temperature to be controlled into the range of about 500 to 700° C. In order to promote the alloying to heighten the Mn concentration in the galvanizing coating layer, the alloying temperature is preferably set to 560° C. or higher. The temperature is more preferably 600° C. or higher, even more preferably 650° C. or higher.

The thus obtained hot-dip galvannealed steel sheet is used suitably as a steel sheet for hot stamping.

The present invention also includes a method for manufacturing a steel part that is characterized by performing hot stamping, using the hot-dip galvannealed steel sheet. A step for the hot stamping is not particularly limited. Thus, an ordinarily usable method is adoptable. The hot stamping step includes a heating step, a stamping step, and a cooling step. In order to obtain the steel part with good properties, it is preferred to adopt conditions described below in each of the steps.

[Heating Step]

In the heating step, the hot-dip galvannealed steel sheet is heated. The heating temperature is preferably set to the $Ac_1$ point or higher. The heating temperature is more preferably {the $Ac_1$ point+(the $Ac_3$ point−the $Ac_1$ point)/4}° C. or higher, even more preferably {the $Ac_1$ point+(the $Ac_3$ point−the $Ac_1$ point)/2}° C. or higher, even more preferably {the $Ac_1$ point+(the $Ac_3$ point−the $Ac_1$ point)×¾}° C. or higher. The upper limit of the heating temperature is preferably (the $Ac_3$ point+180)° C. or lower, more preferably (the $Ac_3$ point+150)° C. or lower. The restriction of the heating temperature makes it possible to restrain the microstructure constituting the steel part from being coarsened to heighten the ductility and bendability. The heating temperature may be set to a temperature lower than the $Ac_3$ point.

The $Ac_1$ point, the $Ac_3$ point, and the Ms point that will be described later are calculated out in accordance with formulae (1), (2) and (3) each described in "The Physical Metallurgy of Steels, Leslie" (published by Maruzen Corp. on May 31, 1985; p. 273) and shown below. In the formulae (1) to (3), each pair of parentheses [] represents the content by percentage (% by mass) of an element therein. It is sufficient for the content by percentage of an element that is not contained in the steel sheet to be set to 0% by mass to make a calculation.

$$\text{The } Ac_1 \text{ point (° C.)} = 723 - 10.7 \times [Mn] - 16.9 \times [Ni] + 29.1 \times [Si] + 16.9 \times [Cr] \quad (1)$$

$$\text{The } Ac_3 \text{ point (° C.)} = 910 - 203 \times ([C]^{0.5}) - 15.2 \times [Ni] + 44.7 \times + 31.5 \times [Mo] - 30 \times [Mn] - 11 \times [Cr] - 20 \times [Cu] + 700 \times [P] + 400 \times [Al] + 400 \times [Ti] \quad (2)$$

$$\text{The Ms point (° C.)} = 561 - 474 \times [C] - 33 \times [Mn] - 17 \times [Ni] - 17 \times [Cr] - 21 \times [Mo] \quad (3)$$

In the heating step, the temperature of the steel sheet does not need to be constantly measured. When the temperature of the steel sheet is measured in a preliminary test and conditions for the temperature control are controllable, the temperature may not be measured when the product is manufactured. The temperature-raising rate up to the highest temperature at the heating time is not particularly limited. As a method for the heating, the following is adoptable: furnace heating, electric conduction heating, induction heating or some other.

After the temperature of the steel sheet reaches the above-mentioned heating temperature, the lower limit of the period for holding the heating temperature is not particularly limited. The lower limit is set as follows: for example, 15 seconds or longer, more preferably 30 seconds or longer, even more preferably 60 seconds or longer. In the meantime, the upper limit of the holding period is more preferably 30 minutes or shorter, more preferably 15 minutes or shorter, even more preferably 7 minutes or shorter to cause the growth of grains of austenite to be restrained to improve the drawability in hot forming, and the toughness and other properties of the shaped part. In order to cause the hot-dip galvannealed steel sheet to ensure a better adhesion of coating film, the holding period is even more preferably 6 minutes or shorter, most preferably 5 minutes or shorter.

The heating atmosphere is not particularly limited as far as the atmosphere permits conditions that the galvanizing coating layer does not ignite. When an oxide film is formed on the surface of the galvanizing coating layer, the ignition can be restrained. Thus, the heating atmosphere is preferably, for example, the air atmosphere. However, even when an oxidizing atmosphere or reducing atmosphere is used, no problem is caused as far as the atmosphere permits conditions that the surface is covered with an oxide film.

[Stamping Step]

In the stamping step, the steel sheet heated in the heating step is stamped (press-formed). The temperature of the start of the stamping (hot pressing) is not particularly limited. By setting this temperature into, for example, a range from the Ms point up to the above-mentioned heating point both inclusive, the working is easily attained and further a load at the stamping time (forming load of press forming) can be sufficiently decreased. The stamping start temperature is more preferably 450° C. or higher, even more preferably 500° C. or higher. The stamping start temperature is, for example, 750° C. or lower, preferably 700° C. or lower, more preferably 650° C. or lower.

[Cooling Step]

In the cooling step, the steel sheet heated in the heating step is cooled. Manners of the cooling in this step include natural cooling. Thus, the cooling of the steel sheet is started just after the heating step. The method for the cooling is not particularly limited. Examples thereof include a cooling method using water, oil, mist or some other; a method of holding the stamped steel sheet in the stamping tool, thereby cooling the steel sheet through this tool; and a combination of these methods.

In the cooling step, the cooling rate is not particularly limited. For example, in a temperature range from the above-mentioned heating temperature to the Ms point, the average cooling rate may be set to 2° C./second or more. The average cooling rate is more preferably 5° C./second or more, even more preferably 7° C./second or more. The average cooling rate is preferably 70° C./second or less, more preferably 60° C./second or less, even more preferably 50° C./second or less.

In an example of the hot stamping step, for example, a method is used in which the steel sheet is heated to the $Ac_3$ transformation point or higher to be made into austenite, and then the shaping or forming of the steel sheet is finished (at the time when the tool reaches the bottom dead point position) at a temperature of about 550° C. or higher.

Usually, in the hot stamping step, the whole of the steel sheet is subjected to quench hardening. However, only its partial region may be subjected to quench hardening by restricting its region for the heating or region that is brought into contact with the tool to the partial region of the steel sheet.

When the steel sheet of the present invention is used to manufacture a steel part (preferably to manufacture a steel part under the above-mentioned conditions) by hot stamping, there is not easily generated an adhesion of zinc onto the tool by melted zinc remaining in its galvanizing coating layer, so that costs for managing the tool can be decreased. Moreover, liquid metal embrittlement (LME) is not generated, either, to yield a steel part high in quality stability. The resultant steel part is usable for, for example, cars.

The present application claims the priority benefit based on Japanese Patent Application No. 2013-094129 filed on Apr. 26, 2013. The entire contents of the specification of the Japanese Patent Application No. 2013-094129 filed on Apr. 26, 2013 are incorporated into the present invention for reference for the present application.

EXAMPLES

Hereinafter, the present invention will be specifically described by way of working examples thereof. However, the invention is not limited by the examples. Of course, the examples may be appropriately modified and carried out as far as the modified examples conform to the subject matters thereof that have been described above or will be described hereinafter. The modified examples are each included in the technical scope of the invention.

A slab made of a steel having each chemical component composition shown in Table 1 was heated to 1200° C., and then subjected to "hot rolling [finish delivery rolling→coiling] according to a method described in Table 1→descaling treatment based on pickling step→cold rolling" to yield a cold-rolled steel sheet as an original steel sheet. In Table 1, finish delivery temperature and coiling temperature are represented by FDT and CT, respectively.

Each of the thus obtained cold-rolled steel sheets was used and measured about individual items described below. Measurement of the Tensile Strength after the Steel Sheet was Hot-Stamped:

The cold-rolled steel sheet was cut to yield a strip-form blank (length: 30 mm, and width: 210 mm). The blank was used and subjected to a heat pattern simulating hot stamping, as follows:

Firstly, the blank was annealed in a 5%-$H_2$/$N_2$ reducing atmosphere having a dew point of −45° C. at 600° C. for 90 seconds, which simulated annealing before galvanizing, and then cooled to room temperature. Thereafter, the blank was again put into a heating furnace the temperature of which was kept at 930° C. in the air atmosphere, and stayed therein for 4 minutes. The blank was heated to turn the temperature of a surface portion of the center of the blank (a surface portion of the center of the sheet) to 930° C. Next, the blank was taken out from the heating furnace, and immediately cooled with water.

A JIS-#5-test piece was cut out from the blank subjected to the hot stamping simulating experiment, and subjected to a tensile test by a method described in JIS Z 2201 to measure the tensile strength of the hot-stamped steel sheet. In this tensile test, the tensile speed was set to 10 mm/min. When the tensile strength of the hot-stamped steel sheet was 980 MPa or more, the steel sheet was judged to be acceptable (o); or when the tensile strength was less than 980 MPa, the steel sheet was judged to be unacceptable (x).

TABLE 1

| Original steel sheet No. | Component composition (the balance: iron and inevitable impurities) of original steel sheet (base steel sheet) (unit: "% by mass" about any element other than B, and "ppm by mass" about B) | | | | | | | | | | | |
|---|---|---|---|---|---|---|---|---|---|---|---|---|
| | C | Si | Mn | P | S | N | Al | B | Ti | Cr | Mo | Nb |
| A | 0.22 | 1.15 | 2.2 | 0.01 | 0.0009 | 0.0036 | 0.043 | 21 | 0.025 | — | — | — |
| B | 0.23 | 1.12 | 1.2 | 0.01 | 0.0010 | 0.0039 | 0.040 | 20 | 0.031 | 0.2 | — | — |
| C | 0.215 | 0.04 | 1.21 | 0.008 | 0.0006 | 0.0041 | 0.042 | 38 | 0.038 | 0.25 | — | — |
| D | 0.10 | 1.80 | 2.1 | 0.01 | 0.0030 | 0.0039 | 0.036 | — | 0.060 | 0.2 | — | — |
| E | 0.21 | 1.10 | 2.2 | 0.01 | 0.0009 | 0.0046 | 0.045 | 10 | 0.021 | 0.1 | — | 0.01 |
| F | 0.22 | 1.20 | 2.5 | 0.01 | 0.0009 | 0.0041 | 0.037 | 20 | 0.012 | 0.1 | — | — |
| G | 0.30 | 1.10 | 2.3 | 0.01 | 0.0009 | 0.0040 | 0.041 | 15 | 0.015 | 0.1 | — | — |
| H | 0.20 | 1.00 | 2.4 | 0.01 | 0.0009 | 0.0042 | 0.040 | 18 | 0.022 | 0.1 | — | — |
| I | 0.25 | 1.20 | 2.1 | 0.01 | 0.0009 | 0.0043 | 0.042 | 11 | 0.018 | 0.1 | — | — |
| J | 0.24 | 1.10 | 1.9 | 0.01 | 0.0009 | 0.0043 | 0.043 | 20 | 0.019 | 0.1 | 0.01 | — |
| K | 0.17 | 1.35 | 2.2 | 0.01 | 0.0010 | 0.0044 | 0.040 | — | — | — | — | — |

| Original steel sheet No. | Component composition (the balance: iron and inevitable impurities) of original steel sheet (base steel sheet) (unit: "% by mass" about any element other than B, and "ppm by mass" about B) | | | | Hot rolling | | Cold rolling | After hot stamping | |
|---|---|---|---|---|---|---|---|---|---|
| | Zr | V | Cu | Ni | FDT °C. | CT °C. | Thickness mm | Thickness mm | Tensile strength | Welding strength |
| A | — | — | — | — | 920 | 650 | 2.3 | 1.4 | o | o |
| B | — | — | — | — | 880 | 500 | 2.3 | 1.4 | o | o |
| C | — | — | 0.01 | — | 880 | 600 | 2.6 | 1.4 | o | X |
| D | — | — | — | — | 880 | 600 | 2.6 | 1.4 | o | o |
| E | — | — | — | — | 920 | 650 | 2.3 | 1.4 | o | o |
| F | 0.01 | — | — | — | 920 | 650 | 2.3 | 1.4 | o | o |
| G | — | 0.01 | — | — | 920 | 650 | 2.3 | 1.4 | o | o |
| H | — | — | 0.04 | — | 920 | 650 | 2.3 | 1.4 | o | o |
| I | — | — | — | 0.03 | 920 | 650 | 2.3 | 1.4 | o | o |
| J | — | — | — | — | 920 | 650 | 2.3 | 1.4 | o | o |
| K | — | — | — | — | 900 | 600 | 2.3 | 1.4 | o | o |

Measurement of the Welding Strength after the Steel Sheet was Hot-Stamped:

The same blank as subjected to the hot stamping simulating experiment was subjected to a spot-welding test described below. Its bonded region was measured about the strength thereof (cross joint breaking load; the welding strength of the spot-welded region). The welding current was adjusted to set the nugget diameter to 4×√t (t: sheet thickness). When the welding strength was 3.0 kN or more, the steel sheet was judged to be acceptable (○); or when the welding strength was less than 3.0 kN, the steel sheet was judged to be unacceptable (x).

Test piece conditions: test piece for cross tension (according to JIS Z 3137)
 Welder: single-phase AC spot welder
 Electrodes: a dome radius type having a tip diameter of 6 mm
 Pressurizing force: 4 kN
 Initial pressurizing period: 60 cycles
 Electric conduction period: 10 cycles (power source frequency: 60 Hz)

Production of Each Galvanized Steel Sheet:

Next, each of the resultant cold-rolled steel sheets (the individual original steel sheets shown in Table 1) was cut to yield a test piece of 100 mm×150 mm size. This test piece was subjected to electrolytic degreasing in a 3% sodium orthosilicate of 60° C. temperature at 20 A for 20 seconds, and then washed with flowing tap water for 5 seconds. In a galvanizing simulator, the thus alkali-degreased test piece was used and annealed in a 5%-$H_2/N_2$ reducing atmosphere having a dew point of −45° C. under conditions (a soaking period and a soaking temperature) described in Table 2, and then cooled from the soaking temperature in Table 2 to 460° C. at an average cooling rate of 5 to 15° C./second. Next, the resultant was galvanized in a zinc galvanizing bath (bath temperature: 460° C.) composed of 0.13% Al, and Zn as the balance, and then wiped. Next, the steel was subjected to alloying treatment under conditions described in Table 2 to yield a hot-dip galvannealed steel sheet. Hereinafter, the hot-dip galvannealed steel sheet may be referred to merely as the "galvannealed steel sheet".

In Table 2, in Experiments Nos. 9 and 10, the annealing was performed by a redox method. About conditions for the production including this method, the air-fuel ratio was set into the range of 0.9 to 1.4 in an oxidizing zone. In a reducing zone, the steel sheet was reduced and soaked at 800 to 900° C. in an atmosphere containing hydrogen and nitrogen and having a dew point of −30 to −60° C., and then cooled to 460° C. at an average cooling rate of 5 to 15° C./second. The steel sheet was then galvanized in a zinc galvanizing bath (Al concentration: 0.05 to 0.2%, and bath temperature: 450 to 470° C.), wiped and then subjected to alloying treatment under conditions shown in Table 2.

Each of the hot-dip galvannealed steel sheets was used to make evaluations described below.

Measurement of the Coating Weight of Galvanizing Coating Layer:

The galvannealed steel sheet was immersed in a solution in which hexamethylenetetramine was added to 18% hydrochloric acid to dissolve only the galvanizing coating layer. From a change in the mass before and after the dissolution, the coating weight of galvanizing coating layer was calculated out.

Measurement of the Mn Concentration in the Galvanizing Coating Layer:

The component composition (in particular, Mn concentration) in the galvanizing coating layer of each of the resultant hot-dip galvannealed steel sheets was analyzed as follows: the galvannealed steel sheet was immersed in a solution in which hexamethylenetetramine was added to 18% hydrochloric acid to dissolve only the galvanizing coating layer. The resultant solution was analyzed by inductively coupled plasma (ICP) emission spectrochemical analysis (a machine used therefor: ICPS-7510, manufactured by Shimadzu Corp.) to obtain the Mn concentration in the galvanizing coating layer.

Measurement of the Oxygen Concentration in the Interface Between the Galvanizing Coating Layer and the Base Steel Sheet of Each of the Galvannealed Steel Sheets:

The oxygen concentration in the interface between the galvanizing coating layer and the base steel sheet of each of the hot-dip galvannealed steel sheet was measured, using a machine GD-OES (GDA 750, manufactured by Spectruma Analytik GmbH). Detailedly, in this analyzing method, in a sample of the steel sheet, respective concentration profiles of Zn, Fe and O were obtained in the galvanizing coating layer depth direction. In these profiles, a maximum O concentration in a range (measurement range) extending upwards and downwards by 3 μm from the intersection point (depth) of the Zn and Fe concentrations was obtained as the oxygen concentration in the interface (interfacial oxygen concentration) between the galvanizing coating layer and the base steel sheet. When this interfacial oxygen concentration was 0.50% or less, the steel sheet was judged to be acceptable (○); or when the interfacial oxygen concentration was more than 0.50%, the steel sheet was judged to be unacceptable (x).

Figure 1A:
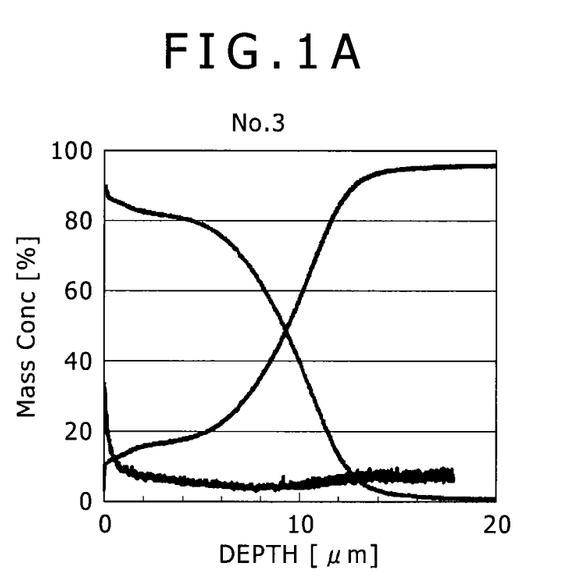
FIG. 1A is a graph showing a glow discharge-optical emission spectroscopy (GD-OES) results of Experiment No. 3 in Table 2 in Examples.
Figure 1B:
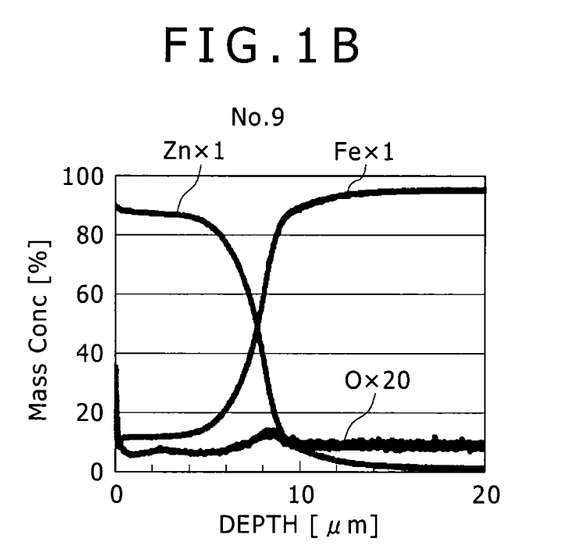
FIG. 1B is a graph showing a glow discharge-optical emission spectroscopy (GD-OES) results of Experiment No. 9 in Table 2 in Examples.

An example thereof is shown in FIGS. 1A and 1B. In FIG. 1B, "Zn×1", "Fe×1" and "O×20" show that concentration profile data shown in FIG. 1B are equal to measured values about Zn, measured values about Fe, and 20 times measured values about O, respectively. This matter is the same as in FIG. 1A. FIG. 1A shows measured results of the galvannealed steel sheet of Experiment No. 3 in Table 2 before the hot stamping experiment. From the measured results, no conspicuous O concentration peak is identified. In other words, it is understood that in Experiment No. 3, an oxide is not substantially present in the interface between the galvanizing coating layer and the base steel sheet of the hot-dip galvannealed steel sheet. By contrast, FIG. 1B shows measured results of the galvannealed steel sheet of Experiment No. 9 in Table 2 before the hot stamping experiment. From the experiment results, an O concentration peak can be identified. In other words, it is understood that in Experiment No. 9, an oxide is present in the interface between the galvanizing coating layer and the base steel sheet of the hot-dip galvannealed steel sheet. Also about the other examples in Table 2, the respective interfacial oxygen concentrations were measured in the same way as described above.

Evaluation of the Adhesion of Coating Film:

For each of Experiments Nos. in Table 2, three sheets (100 mm×150 mm×1.4 mm in thickness) of the hot-dip galvannealed steel species of the Experiment No. were prepared. These sheets were subjected to the following treatment simulating hot stamping: The sheets were held in a heating furnace the temperature of which was kept at 900° C. in the air atmosphere for a predetermined period (4 to 8 minutes). Each of the sheets was then taken out from the heating furnace, and cooled with air. The average cooling rate down to the Ms point at this time was 7° C./s. The galvannealed steel sheet the temperature of which was lowered into the vicinity of room temperature was subjected to phosphate treatment, using a product, SD 6350, manufactured by NIPPONPAINT Co., Ltd. to give a coating weight of 3 g/m². Furthermore, the galvannealed steel sheet subjected to the phosphate treatment was subjected to electrodeposition under an electric conduction at 200 V, using a product, CATION ED GT10HT GRAY, manufactured by Kansai Paint Co., Ltd. and to baking at 150° C. for 20 minutes to form a final coating film of 15 μm thickness. In this way, a specimen was yielded.

The specimen was used to evaluate the adhesion of coating film thereof as follows: The specimen was immersed in a 5%-by-mass salt in water (water temperature: 50° C.) for 500 hours, and then a cellophane tape ("SELLOTAPE" (registered trade name) CT405AP-24, manufactured by Nichiban Co., Ltd.) was bonded onto the whole (100 mm×150 mm) of an evaluating surface of the specimen. Immediately, the tape was peeled off by hand, and the area ratio (coating-film-peeled-area ratio, % by area) of a portion of the surface from which the coating film was peeled. In accordance with a criterion described below, the adhesion of coating film was evaluated. In the present examples, cases each represented by ○ or ⊚ were judged to be acceptable.

Adhesion of Coating Film Evaluating Criterion:
  ⊚: the coating-film-peeled-area ratio is 5% or less.
  ○: the coating-film-peeled-area ratio is more than 5%, and 10% or less.
  Δ: the coating-film-peeled-area ratio was more than 10%, and 25% or less.
  x: the coating-film-peeled-area ratio was more than 25%.
  These results are together shown in Table 2.

By contrast, other than each of the Experiments Nos. did not satisfy one or more of the specified requirements to be poor in the properties.

Detailedly, Experiments Nos. 3 and 4 were each excessive in coating weight of galvanizing coating layer to be poor in adhesion of coating film.

Experiments Nos. 5 to 8 were each short in Mn concentration in their galvanizing coating layer to be poor in adhesion of coating film. Experiments Nos. 7 and 8 (their original steel sheet: No. C) were each also short in Si proportion in their base steel sheet to be poor in welding strength of their spot-welded region, which was a property of the original steel sheet.

Experiments Nos. 9 and 10 were high in interfacial oxygen concentration, that is, contained a large proportion of oxides in the interface between the galvanizing coating layer and the base steel sheet of their galvannealed steel sheet. Thus, the experiments were deteriorated in adhesion of coating film. It is understood that in order to restrain the interfacial oxygen concentration, it is preferred to perform the annealing not by any redox method but by reducing annealing under the conditions recommended in the present invention. In Experiments Nos. 9 and 10, the Mn concentration in their galvanizing coating layer was kept at a predetermined level or more. This would be because a Mn oxide that does not contribute to an improvement in the adhesion of coating film is contained in a large proportion.

TABLE 2

| Experiment No. | Original steel sheet No. | Mn proportion (% by mass) in original steel sheet | Annealing Soaking temperature (° C.) | Soaking period (sec) | Alloying treatment Temperature (° C.) | Period (sec) | Coating weight (g/m²) | Galvanizing coating layer Mn concentration (% by mass) in galvanizing coating layer | Fe concentration (% by mass) in galvanizing coating layer | Interfacial oxygen concentration | Heating period (minutes) in hot stamping | Adhesion of coating film after hot stamping and coating |
|---|---|---|---|---|---|---|---|---|---|---|---|---|
| 1 | A | 2.2 | 650 | 90 | 600 | 20 | 40 | 0.36 | 14 | ○ | 4 | ⊚ |
| 2 | A | 2.2 | 650 | 90 | 600 | 20 | 40 | 0.36 | 14 | ○ | 8 | ○ |
| 3 | A | 2.2 | 650 | 90 | 650 | 20 | 79 | 0.37 | 20 | ○ | 4 | Δ |
| 4 | A | 2.2 | 650 | 90 | 650 | 20 | 79 | 0.37 | 20 | ○ | 8 | Δ |
| 5 | B | 1.2 | 650 | 90 | 650 | 20 | 72 | 0.14 | 11 | ○ | 4 | Δ |
| 6 | B | 1.2 | 650 | 90 | 650 | 20 | 72 | 0.14 | 11 | ○ | 8 | X |
| 7 | C | 1.21 | 700 | 90 | 650 | 20 | 57 | 0.16 | 13 | ○ | 4 | Δ |
| 8 | C | 1.21 | 700 | 90 | 650 | 20 | 57 | 0.16 | 13 | ○ | 8 | X |
| 9 | D | 2.1 | Redox | | 650 | 20 | 56 | 0.40 | 11 | X | 4 | X |
| 10 | D | 2.1 | Redox | | 650 | 20 | 56 | 0.40 | 11 | X | 6 | X |
| 11 | E | 2.2 | 650 | 90 | 550 | 20 | 40 | 0.36 | 13 | ○ | 8 | ○ |
| 12 | F | 2.5 | 650 | 90 | 600 | 20 | 39 | 0.37 | 14 | ○ | 8 | ○ |
| 13 | G | 2.3 | 650 | 90 | 600 | 20 | 40 | 0.37 | 14 | ○ | 8 | ○ |
| 14 | H | 2.4 | 650 | 90 | 600 | 20 | 39 | 0.38 | 14 | ○ | 8 | ○ |
| 15 | I | 2.1 | 650 | 90 | 600 | 20 | 38 | 0.38 | 14 | ○ | 8 | ○ |
| 16 | J | 1.9 | 650 | 90 | 600 | 20 | 40 | 0.37 | 14 | ○ | 8 | ○ |
| 17 | K | 2.2 | 650 | 90 | 550 | 20 | 37 | 0.39 | 15 | ○ | 8 | ○ |
| 18 | A | 2.2 | 650 | 90 | 600 | 20 | 54 | 0.30 | 14 | ○ | 4 | ⊚ |
| 19 | A | 2.2 | 650 | 90 | 600 | 20 | 54 | 0.30 | 14 | ○ | 8 | ○ |
| 20 | A | 2.2 | 650 | 90 | 600 | 20 | 65 | 0.25 | 14 | ○ | 4 | ⊚ |
| 21 | A | 2.2 | 650 | 90 | 600 | 20 | 65 | 0.25 | 14 | ○ | 8 | ○ |
| 22 | A | 2.2 | 650 | 90 | 600 | 20 | 74 | 0.23 | 13 | ○ | 4 | ⊚ |
| 23 | A | 2.2 | 650 | 90 | 600 | 20 | 74 | 0.23 | 13 | ○ | 8 | ○ |

According to Table 2, Experiments Nos. 1, 2 and 11 to 23 satisfied the specified requirements, so that the original steel sheets were good in the properties and further the resultant hot-dip galvannealed steel sheets were very good in adhesion of coating film. In particular, Experiments Nos. 1, 18, 20 and 22, in which the hot stamping heating period was restrained, a better adhesion of coating film was obtained.

INDUSTRIAL APPLICABILITY

The hot-dip galvannealed steel sheet of the present invention for hot stamping is favorably usable for, for example, car parts, such as a car chassis, suspension system parts, and reinforcing parts.

The invention claimed is:

1. A hot-dip galvannealed steel sheet, comprising:
   a base steel sheet comprising, in % by mass for elements here and hereinafter, 0.10% to 0.5% of C, 0.7% to 2.5% of Si, 1.5% to 3% of Mn and 0.01% to 0.5% of Al, and
   a galvanizing coating layer, which has a concentration of Mn in a solid solution state of 0.20% or more, and a coating weight of 75 g/m$^2$ or less,
   wherein an oxygen concentration in an interface between the galvanizing coating layer and the base steel sheet is 0.50% or less.

2. The hot-dip galvannealed steel sheet according to claim 1, wherein the base steel sheet further comprises, in % by mass, at least one element selected from the group consisting of:
   (a) B in a proportion of more than 0% to 0.005%,
   (b) Ti in a proportion of more than 0% to 0.10%,
   (c) at least one element of Cr and Mo in a total proportion of more than 0% to 2.5%,
   (d) at least one element selected from the group consisting of Nb, Zr and V in a total proportion of more than 0% to 0.1%, and
   (e) at least one element of Cu and Ni in a total proportion of more than 0% to 1%.

3. A method for manufacturing a steel part, the method comprising:
   performing hot stamping employing the hot-dip galvannealed steel sheet recited in claim 1.

* * * * *